United States Patent [19]

Orlando

[11] Patent Number: 5,272,707
[45] Date of Patent: Dec. 21, 1993

[54] LASER PATH SWITCHING MECHANISM
[75] Inventor: Robert J. Orlando, Apopka, Fla.
[73] Assignee: Litton Systems, Inc., Little Falls, N.J.
[21] Appl. No.: 979,793
[22] Filed: Nov. 20, 1992
[51] Int. Cl.⁵ .............................................. H01S 3/10
[52] U.S. Cl. ...................................... 372/9; 372/100; 372/107; 372/108
[58] Field of Search .................. 372/92, 100, 108, 65, 372/107, 9

[56] References Cited

U.S. PATENT DOCUMENTS

| | | | |
|---|---|---|---|
| 4,016,504 | 4/1977 | Kiallminzer | 372/100 |
| 4,097,818 | 6/1978 | Manoukian et al. | 372/100 |
| 4,852,115 | 7/1989 | Viherkoski | 372/92 |
| 4,965,807 | 10/1990 | Guillet et al. | 372/92 |
| 5,084,883 | 1/1992 | Khalid et al. | 372/65 |

Primary Examiner—Leon Scott, Jr.
Attorney, Agent, or Firm—William M. Hobby, III

[57] ABSTRACT

An optical beam switching mechanism is used from switching a light beam between a plurality of light beam paths. A rhombic prism is mounted for rotation on an axis and is rotated between positions by a geneva mechanism. A plurality of microswitches are positioned to reposition the prism after rotation to a predetermined position. The geneva mechanism is driven by an electric motor and has an index wheel attached to a cradle supporting the prism which index wheel is rotated by a drive arm connected to the electric motor.

20 Claims, 2 Drawing Sheets

LASER PATH SWITCHING MECHANISM

BACKGROUND OF THE INVENTION

The present invention relates to the path switching of light beams and especially the path switching of a laser beam using optics rotating on an alignment insensitive axis.

It has been common in the past to provide various types of optical beams and especially laser beams with various types of optics for controlling the beam. Such prior optics include rapidly rotating beams for Q-switching the laser as well as various means for shifting the optics and prisms in different positions for controlling the output of the beam. The present invention relates to a mechanism for switching an optical beam, such as a laser beam, between a plurality of paths and especially from one path to a second path with a mechanism which is insensitive to misalignment and to temperature extremes and severe vibrations. This is accomplished by the use of a prism which is supported in a cradle which uses a geneva mechanism for moving the prism on axis between positions and which produces a very accurate positioning using microswitches to stop the rotation of the prism in a precise position.

Prior U.S. patents which show shifting mechanisms for changing beams of a laser can be seen in the Guillet et al. U.S. Pat. No. 4,965,807, which is a laser apparatus having two different reflectors positioned on either end of a laser cavity and having supplementary resonant cavity structure having two different reflectors and means for shifting the reflectors in the resonant cavity between the first and second positions at both ends of the cavity simultaneously. A solenoid or the like is used to shift a shaft on its axis to move the reflectors from one reflector position to another. In the Viherkoski U.S. Pat. No. 4,852,115, a laser head is illustrated having a plurality of light transmitting and reflecting surfaces which are rotated at both ends of a laser cavity to thereby modify the laser cavity by the shifting of lenses between different positions. It has also been common in the past to use a geneva type mechanism in clocks before the advent of electronic clocks and watches. The present invention, on the other hand, is attempting to switch a light beam path between two or more paths which switches a crystal between positions mechanically in a manner that is insensitive to misalignment, temperature extremes, and severe vibrations.

SUMMARY OF THE INVENTION

An object of the present invention is to switch an optical light beam between a plurality of paths in a manner which is insensitive to misalignment, temperature extremes, and severe vibration.

An optical beam switching mechanism is used for switching a light beam between a plurality of light beam paths. A rhombic prism is mounted on a cradle which is rotated between positions by a geneva mechanism. Two microswitches are positioned to sense the prism position and control the drive motor. The geneva mechanism is driven by an electric motor and has an index wheel attached to a cradle supporting the prism which index wheel is rotated by a drive arm connected to the electric motor.

BRIEF DESCRIPTION OF THE DRAWING

Other objects features and advantages of the present invent be apparent from the written description and the drawings in which.

DESCRIPTION OF THE PREFERRED EMBODIMENT

Figure 1:
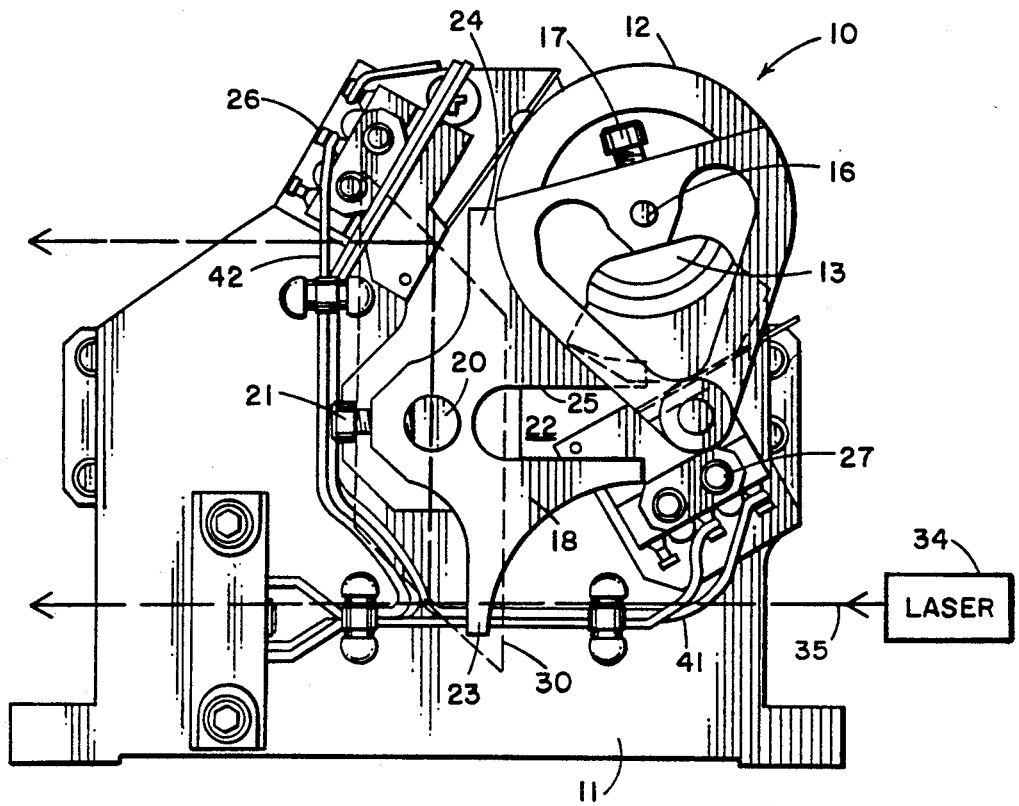
FIG. 1 is a side-elevation of the present invention having the light beam and light beam source shown diagrammatically.
Figure 2:
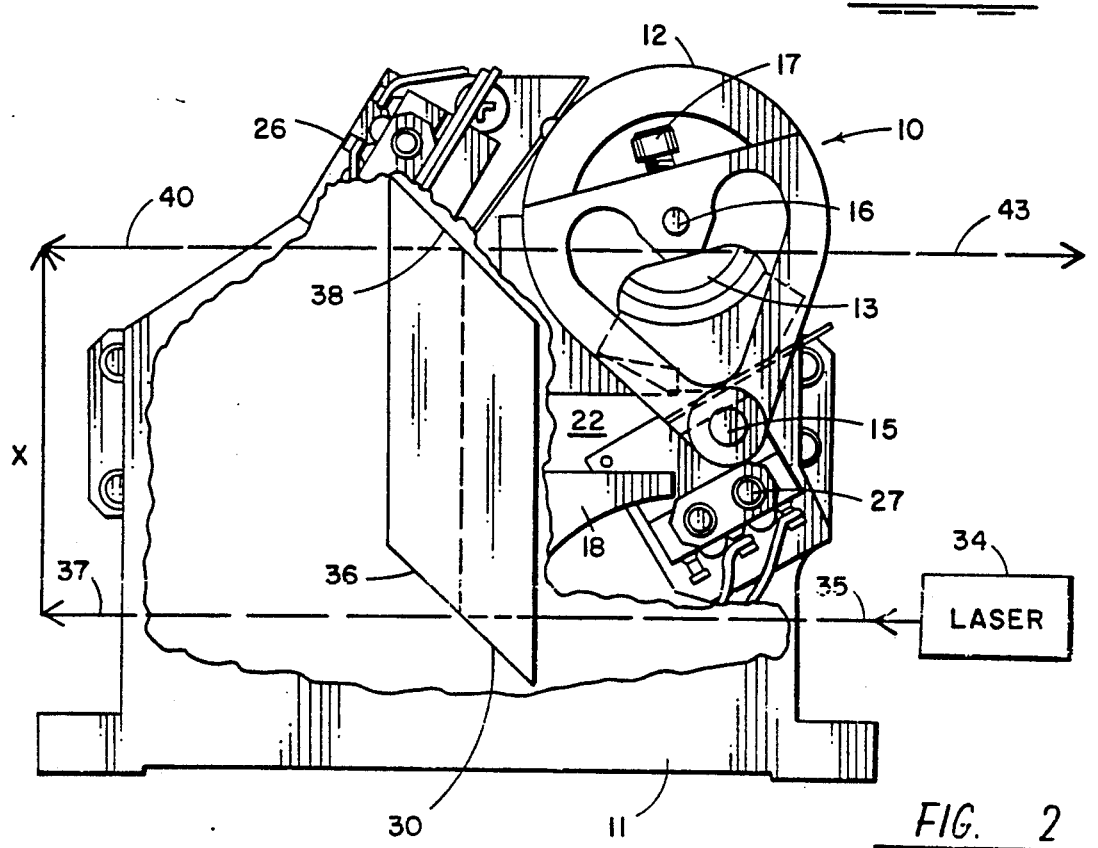
FIG. 2 is a side-elevation in accordance with FIG. 1 portions removed to more clearly show the position of the prism.
Figure 3:
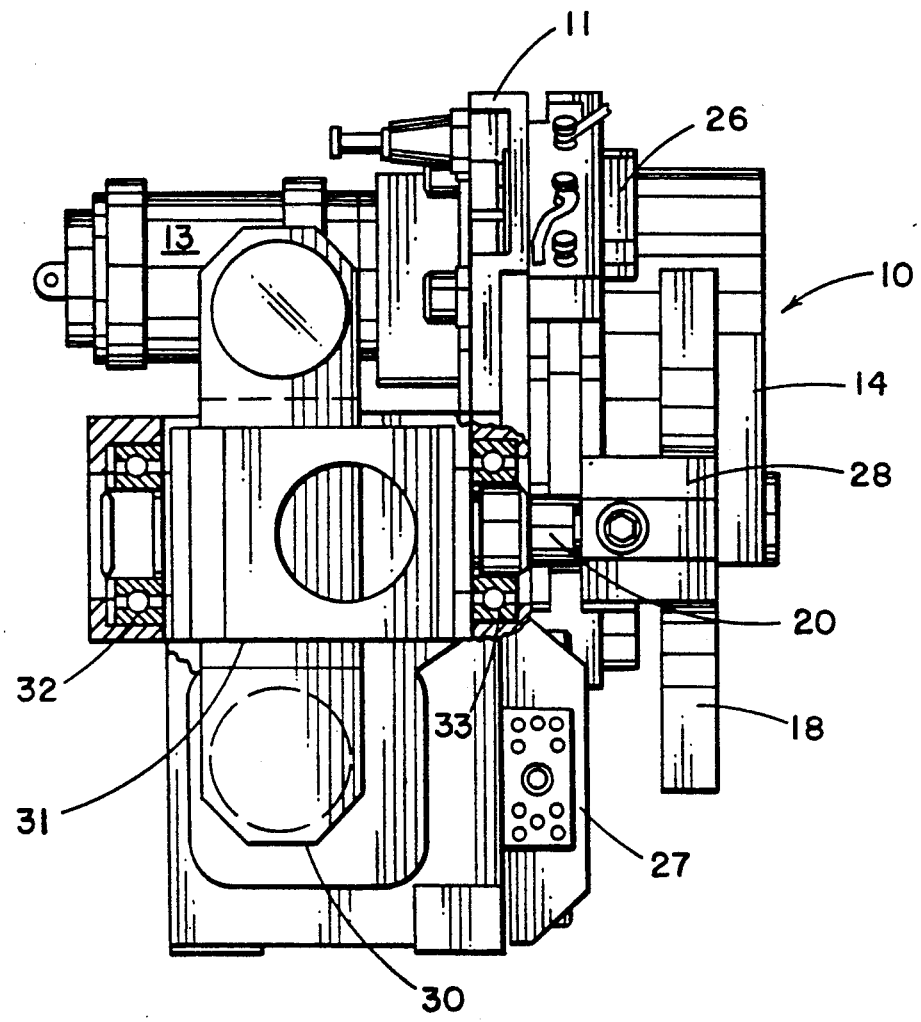
FIG. 3 is a sectional view of the beam switching mechanism of FIGS. 1 and 2.

Referring to the drawing, FIGS. 1 through 3, an optical beam switching mechanism 10 has a base frame member 11 supporting a geneva type mechanism with drive member 12 and index wheel 18 driven by an electric D.C. motor 13. The geneva mechanism includes a drive arm 12 having a roller 15 mounted on the end thereof and being mounted to the shaft of the electric motor 13. A threaded bolt 17 attaches the drive member 12 to the motor shaft. The drive member 12 rotates to move an index wheel 18 rotating on a shaft 20, part of cradle 31. The index wheel 18 is bolted with a threaded attachment 21 to the shaft 20. The index wheel includes a slotted portion 22 for capturing the arm roller 15 for driving the index wheel and also has an extending arm 23 in one direction and an arm 24 extending in the opposite direction. Thus, rotation of the drive member 12 moves the camming roller 15 in the slot 22 of the index wheel 18 to push against the surfaces 25 of the slot 22 to move the index wheel 18 responsive to the movement of the electric motor 13. The motor is actuated to rotate the arm 14 between positions governed by microswitch 26 at one end and microswitch 27 at another position. Rotation of the geneva mechanism is stopped in either direction by the cam feature on the drive member 12 actuating the microswitch 26 or 27 which turns the electric motor off to stop the rotation of the drive member 12. The retention of the index wheel 18 in the predetermined position is set by the interaction of the cylindrical features of the drive member and index wheel and is thus insensitive to slight drive member overtravel.

An optical element 30, which may be a rhombic prism as shown, is mounted in a cradle 31, as more clearly seen in FIG. 3, which cradle has an integral shaft 20 also supporting the index wheel 18 and is supported with ball bearings 32 on one side and a ball bearing support 33 on the other side of the cradle 31. Cradle 31 has the prism 30 fixedly attached therein which cradle and prism rotate on the bearings 32 and 33 with the rotation of the shaft 20 which passes through the supporting frame base 11.

The light path in one position can been seen in FIG. 2 having a portion of the frame and mechanism cut away to show the prism 30. A laser 34 generates a laser beam 35 which passes into the prism 30 striking the angled surface 36 and is reflected within the prism to surface 38 where the beam is reflected out of the prism on path 40 which is parallel to path 35 but offset by a distance X. Alternatively, a dovetail prism or corner reflection could be used to fold the beam back onto path 43 again offset by X.

Actuation of the geneva mechanism by the dc motor 13 rotates to the drive arm 14 to drive the index wheel 18 to rotate 90° or until the driving arm cam engages the microswitch 26 to thereby stop the dc motor 13 and lock the prism in a 90° position to that shown in FIG. 2 and out of the path 35 of the laser 34. Thus, only a single beam 35 is produced and the dc motor can be actuated again to drive the prism 30 back into the position as shown in FIG. 2 to produce a different beam path.

Also illustrated in the first figure are the conductors 41 connected to the microswitches 27 and the conductors 42 connected to the microswitch 26 which conductors are connected through relays as desired to switch the dc motor 13 from an on to an off position when rotating in either direction.

It should be clear at this time that a mechanism for switching beam paths in a laser has been provided in which mechanism may be mounted directly to the frame of the laser within the laser operating mechanism which may be remotely controlled merely by activating the electric motor 13. However, it should also be clear that beam paths other than those generated by a laser can be shifted without departing from the spirit and scope of the invention and that prisms other than the illustrated rhombic prisms can be utilized to provide two or more beam paths as desired so that the present invention is not to be construed as limited to the forms shown which are to be considered illustrative rather than restrictive.

I claim:

1. An optical beam switching mechanism for switching between a plurality of light beam paths comprising:
   a geneva mechanism;
   a multifaceted prism attached to said geneva mechanism;
   a motor attached to said geneva mechanism for rotating said geneva mechanism upon activation of said motor; and
   a plurality of switches positioned to be actuated by the movement of said geneva mechanism and prism to a predetermined position, whereby an optical path switching mechanism is less sensitive to misalignment.

2. An optical beam switching mechanism for switching between a plurality of light beam paths in accordance with claim 1 in which a laser is positioned to direct a laser beam into said prism mounted on said geneva mechanism.

3. An optical beam switching mechanism for switching between a plurality of light beam paths in accordance with claim 2 in which said prism is a rhomboidal prism.

4. An optical beam switching mechanism for switching between a plurality of light beam paths in accordance with claim 3 in which said plurality of switches includes two switches attached to a base and positioned to verify the position of said geneva mechanism.

5. An optical beam switching mechanism for switching between a plurality of light beam paths in accordance with claim 4 in which said motor is an electric motor.

6. An optical beam switching mechanism for switching between a plurality of light beam paths in accordance with claim 5 in which said motor is a reversible D.C. motor.

7. An optical beam switching mechanism for switching between a plurality of light beam paths in accordance with claim 6 in which said rhomboidal prism is rotated in 90 degree increments and is stopped responsive to said switches.

8. An optical beam switching mechanism for switching between a plurality of light beam paths in accordance with claim 7 in which said rhomboidal prism is bonded to a cradle on said geneva mechanism.

9. An optical beam switching mechanism for switching between a plurality of light beam paths in accordance with claim 8 in which cradle rides on ball bearings.

10. An optical beam switching mechanism for switching between a plurality of light beam paths in accordance with claim 9 in which geneva mechanism has a drive arm rotated by said electric motor and said arm includes a cam surface to activate a microswitch in each position of said geneva mechanism.

11. An optical beam switching mechanism for switching between a plurality of light beam paths in accordance with claim 10 in which said geneva mechanism includes an index wheel connected to said cradle to rotate said cradle and prism upon rotation of said index wheel.

12. An optical beam switching mechanism for switching between a plurality of light beam paths in accordance with claim 11 in includes a drive arm attached to said electric motor and positioned to rotate said index wheel of said geneva mechanism.

13. A laser beam switching mechanism for switching between a plurality of laser beam paths comprising:
    a laser for producing a laser beam;
    a base;
    a prism shifting mechanism attached to said base and having a drive arm and an index wheel;
    a multifaceted prism attached to said prism shifting mechanism and aligned with said laser beam;
    an electric motor attached to said base and prism shifting mechanism for moving said mechanism upon activation of said motor; and
    a plurality of switches attached to said base positioned to be actuated by the movement of said prism shifting mechanism and prism to predetermined positions within said laser beam for switching said laser beam between predetermined beam paths.

14. A laser beam switching mechanism for switching between a plurality of laser beam paths in accordance with claim 13 in which a laser is positioned to direct a light beam into said prism mounted on said prism shifting mechanism.

15. A laser beam switching mechanism for switching between a plurality of laser beam paths in accordance with claim 14 in which said prism is a rhomboidal prism.

16. A laser beam switching mechanism for switching between a plurality of laser beam paths in accordance with claim 15 in which said plurality of switches includes two microswitches attached to said base and positioned to verify the stopped position of said prism shifting mechanism.

17. A laser beam switching mechanism for switching between a plurality of laser beam paths in accordance with claim 16 in which said motor is an electric D.C. motor.

18. A laser beam switching mechanism for switching between a plurality of laser beam paths in accordance with claim 17 in which said rhomboidal prism is rotated 90° and is stopped responsive to said switches.

19. A laser beam switching mechanism for switching between a plurality of laser beam paths in accordance with claim 18 in which said rhomboidal prism is bonded to a cradle rotatably attached to said index wheel.

20. A laser beam switching mechanism for switching between a plurality of laser beam paths in accordance with claim 19 in which said prism shifting mechanism drive arm rotates said index wheel to form a geneva mechanism to rotate said prism.

* * * * *